April 18, 1933.  A. REDLER  1,904,167
CONVEYER
Filed Oct. 6, 1927  2 Sheets-Sheet 1
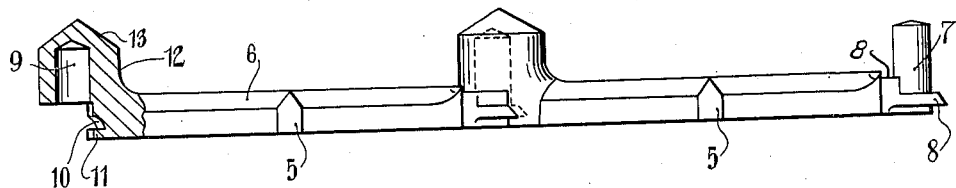
Fig. 1
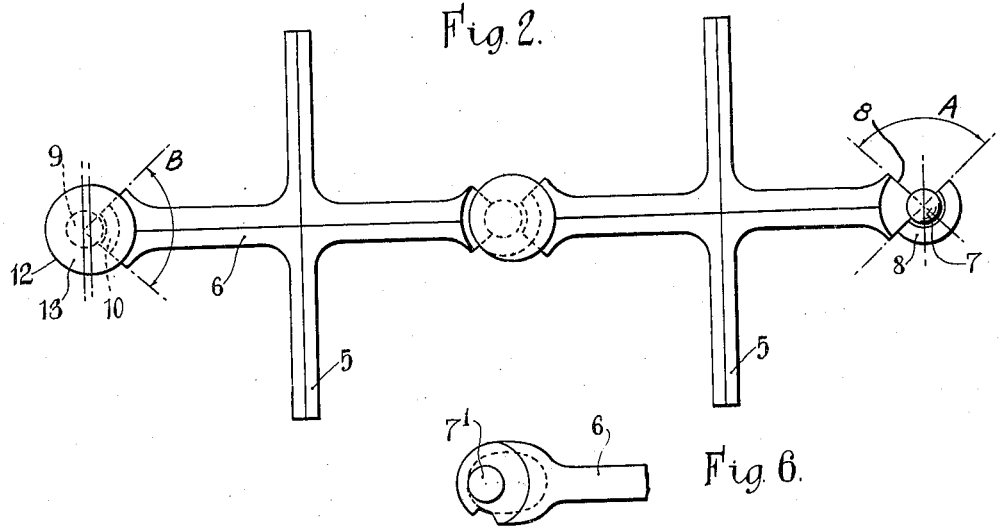
Fig. 2
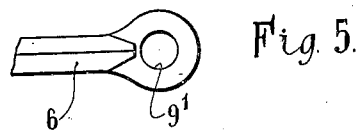
Fig. 6.
Fig. 5.
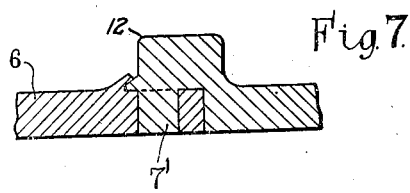
Fig. 7
Inventor
ARNOLD REDLER,
BY
Toulmin & Toulmin
Attorneys April 18, 1933.　　A. REDLER　　1,904,167
CONVEYER
Filed Oct. 6, 1927　　2 Sheets-Sheet 2
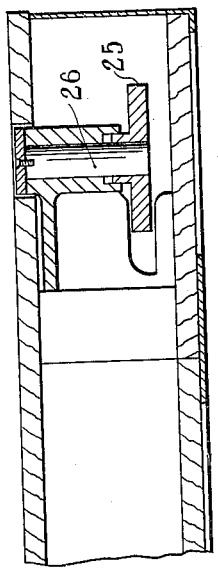
Fig. 3.
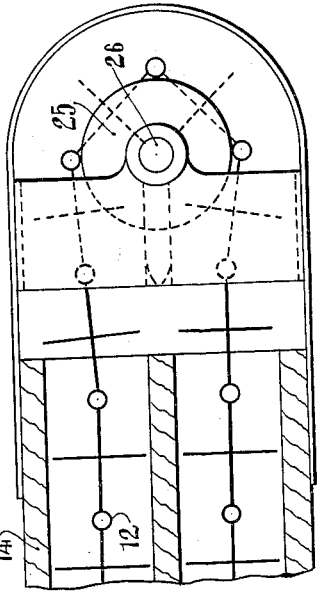
Fig. 4.
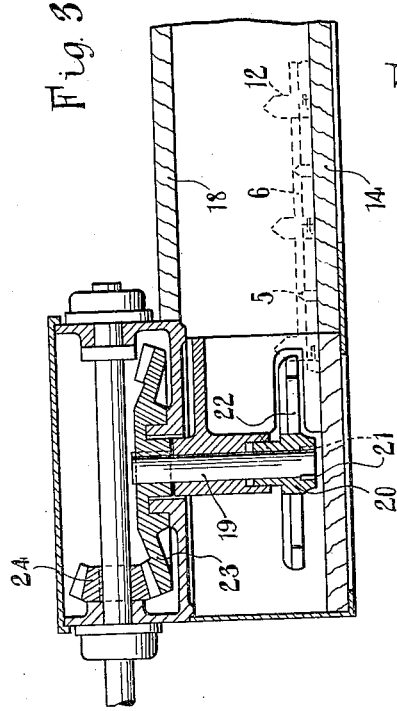
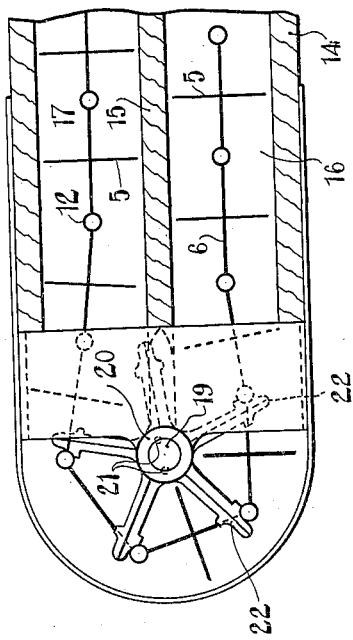
Inventor
ARNOLD REDLER,
BY
Toulmin & Toulmin
Attorneys Patented Apr. 18, 1933

1,904,167

UNITED STATES PATENT OFFICE

ARNOLD REDLER, OF GLOUCESTER, ENGLAND, ASSIGNOR TO REDLER CONVEYOR COMPANY, OF QUINCY, MASSACHUSETTS, A CORPORATION OF MASSACHUSETTS

CONVEYER

Application filed October 6, 1927, Serial No. 224,484, and in Germany October 9, 1926.

This invention relates to conveyers for transporting comminuated material, such for example as grain and bulk material whose degree of subdivision is such that it can be poured.

The invention has for its object generally an improved construction and arrangement of conveyer parts, whereby comminuted material may be transported horizontally in a convenient, efficient and economical manner.

More specifically, it is an object of the invention to provide a conveyer of the character indicated with forward and return runs arranged to operate in the same horizontal plane, the conveyer chain being constructed of links which are adapted to move in a curved path in passing from the return to the forward runs and vice versa about sprocket wheels having axes disposed perpendicular to the horizontal plane, the links and wheels being cooperatively shaped to accomplish this in a relatively small space.

It is a further object to provide a relatively flat link for conveyer chains having articulation in the general plane of the link of a character whereby it is readily assembled and disassembled, but when once in place, is not likely to become displaced.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawings, in which:

Fig. 1 is a side elevation of two links of a conveyer chain constructed in accordance with the invention, parts being broken away;

Fig. 2 is a top plan view of the links shown in Fig. 1;

Fig. 3 is a vertical longitudinal section showing a conveyer having a chain of the character shown in Fig. 1;

Fig. 4 is a horizontal sectional view of the conveyer shown in Fig. 3, the chain being indicated diagrammatically;

Fig. 5 is a fragmentary view of a modified form of link end adapted for the practice of the present invention;

Fig. 6 is a similar view illustrating a form of link end adapted to cooperate with that shown in Fig. 5; and Fig. 7 is a fragmentary sectional view showing the manner of articulating the link-ends illustrated in Figs. 5 and 6.

Referring now to the drawings, and particularly to Figs. 1 and 2, 5 denotes cross-arms shown as projecting in pairs laterally in the same plane from each side of a longitudinally-extending web 6, the cross-arms being rigidly and preferably integrally attached to the webs. The cruciform links thus provided are articulated by cooperatively forming the ends of the webs with pivotal connections adapted to turn about axes that are perpendicular to the general plane of the links. For this purpose the ends of a link are with advantage alternately formed with a pin and a socket arranged to engage in such a manner as to interlock with the end of an adjacent link, when said links are in normal position.

A suitable construction of one such end is shown at the right in Figs. 1 and 2, where 7 denotes an upstanding pivot-pin anchored in a flattened circular portion 8 of the web-end. The construction of the alternate end of a web, which is adapted to cooperate with the pin-end described, is shown at the left in Figs. 1 and 2. Here 9 denotes a socket for receiving a pin formed in an upstanding knob 12, that is integral with the web and cut away at its base so as to fit over the circular portion 8. In order that the fit may be snug, the rear wall of the cut-away portion, shown at 11, is arc-shaped and has a groove 10 cut thereacross for engagement with a segmental rib 8' formed on the circular portion 8.

The rib 8' as shown in Fig. 2 is not continuous entirely about the circular portion 8 but is cut away through an angle A on one side. In the construction shown, this angle is slightly greater than 90° but is so proportioned as to include the angle intercepted by the arcuate wall 11 with a slight clearance. This latter angle is shown at B and in accordance with this principle is approximately equal to 90°.

When it is desired to assemble links thus constructed to form a chain, the cooperating ends of two links are brought together so that the angle A includes the angle B. In this position the webs 6 of the two links are substantially at right angle to one another. The pin 7 of the link shown on the left may now be slipped into the socket 9 of the right link. If the right hand link is now swung through 90° to a position in line with the left hand link, the links will be operatively locked together. The two links are now secured against a displacement in the direction of the axis of the pivot.

The socket 9 is carried not quite through the hollow knob 12. The upper surface 13 of the knob is preferably sloped off conically. Also the upper surfaces of the two arms 5 and of the longitudinal web 6 are sloped off towards both sides. Consequently the material being conveyed cannot remain lying either upon the chain members nor upon the conveyer arms nor upon the links. The chain is "self-cleaning".

In the conveyer shown in Figs. 3 and 4, 14 is a horizontal conduit or channel opening upwardly, which is sub-divided by a vertical partition wall 15 into two parallel channels 16 and 17. Within these channels are disposed the forward and return runs of a conveyer chain of the endless variety composed of links of the character above described. These links thus lie on the bottom of the conduit and move continuously in the same horizontal plane, the articulation employed permitting the links to turn only in their plane about axes perpendicular to such plane. The two channels in which the chain operates may be of substantially any depth, but the ratio of channel depth to channel width may be as great or greater than 50% on account of the relatively high conveyer efficiency achieved with this variety of chain. The two channels may be closed on their upper sides by a cover or a covering board 18, in order to prevent the conveyer channel from being choked by objects or dust falling in. At the left hand end of the channel 14 a star-like sprocket wheel 20 is supported upon a vertical shaft 19, which wheel is keyed to the vertical shaft 19. The ends of the arms 22 of the sprocket wheel are adapted for engagement with the knobs 12 of the conveyer chain. Upon the upper end of the vertical shaft 19 a bevel gear 23 is fixed with which the driving bevel 24 meshes. The upper surfaces of the arms 22 are sloped roof-shape. At the far end of the conveyer the chain passes around a guide roller 25 which is rotatably supported upon a vertical shaft 26. As the wheel 20 engages only with its small arms 22 in the goods to be conveyed therefore the goods can be conveyed from the channel 16 around the reversing point and back into the channel 17.

In operation, it is seen that the driving force transmitted through the driving bevel 23 causes wheel 20 to rotate and move the conveyer chain successively through the channels 16 and 17, the material to be conveyed being introduced and withdrawn at suitable points in the conduits. By the arrangement shown, it is seen that the conveyer chain here employed slides evenly along the bottom of the channels 15 and 16, and since no universal joints are employed, the tendency of the chain to lift or turn, prevalent in other types of conveyers, is here avoided.

The ratio of pitch to depth of the arms 5 and webs 6, is preferably such as to enable the chain to move a relatively great depth of material with the employment of a relatively small amount of energy. In the arrangement shown, the arms 5 have a depth not in excess of 25% of the depth of the conduit. Granular material, such as grain and flour and broken up solid materials, such as coal are readily transported in conduits having conveyer members of this character. Where the parts are thus proportioned, the depth of the material moved may be four or five times greater than the depth of the arms 5 and web 6. This is advantageous, since it has been observed that where the depth is materially less, for example only twice the depth of the conveyer arms, there is relative motion between the grains or particles being transported, so that they tend to grind and partially disintegrate. Where conveyers of the present invention are fully loaded and worked at maximum efficiency, this tendency to grind and disintegrate is avoided.

In the modified form shown in Figs. 5, 6 and 7, the pin 7' is on the underside of the knob and is adapted to engage the hole 9' formed cooperatively in the end of web 6 of the adjacent link.

What I claim and desire to secure by Letters Patent is:

1. A conveyer for transporting comminuted material comprising a conduit formed with a channel having a flat bottom and upstanding sides and a conveyer chain disposed therein consisting of cruciform links having longitudinal webs and rigidly attached cross-arms, said cross-arms extending from intermediate points at each side of said webs and disposed with said webs to lie on said bottom in a plane, articulating means consisting of a pivot pin and receiver therefor formed cooperatively on each pair of web-ends which are adjacently disposed, said pin being arranged to have its axis perpendicular to and extending upwardly from the plane of its web and arms, and interengaging means formed about the respective bases of said pin and receiver and having portions cut away so as to disengage when said webs are swung through a predetermined angle about said pivot out of normal position and to engage and prevent displacement of said pin and receiver when said webs are in normal position.

2. A conveyer for transporting comminuted material comprising a conduit formed with a channel having a flat bottom and upstanding sides and a conveyer chain disposed therein consisting of cruciform links having longitudinal webs and rigidly attached cross-arms, said cross-arms extending from intermediate points at each side of said webs and disposed with said webs to lie on said bottom in a plane, and articulating means consisting of a pivot pin and knob having a pin-receiving socket formed cooperatively on each pair of web-ends which are adjacently disposed, said pin and socket being arranged to have their axes perpendicular to and extending upwardly from the planes of their webs and arms, and inter-engaging means formed about the respective bases of said pin and knob and having portions cut away whereby said links may be swung to disengaging positions.

3. A conveyer for transporting comminuted material comprising a conduit formed with a channel having a flat bottom and upstanding sides and a conveyer chain disposed therein consisting of cruciform links having longitudinal webs and rigidly attached cross-arms, said cross-arms extending from intermediate points at each side of said webs and disposed with said webs to lie on said bottom in a plane, articulating means consisting of a pivot pin and knob having a pin-receiving socket formed cooperatively on each pair of web-ends which are adjacently disposed, said pin and socket being arranged to have their axes perpendicular to the planes of their webs and arms, a rib formed about said pin adjacent its base, and an arc-shaped groove adapted to receive said rib formed directly under said knob, said rib being cut away through an angle at one side which has a magnitude sufficient to include the arc of said groove.

In testimony whereof I affix my signature.

ARNOLD REDLER.